United States Patent [19]

Grettenberg

[11] 4,325,066
[45] Apr. 13, 1982

[54] OVERWATER RADAR NAVIGATION SYSTEM

[76] Inventor: Thomas L. Grettenberg, 2943 Briarwood Dr., Torrance, Calif. 90505

[21] Appl. No.: 187,351

[22] Filed: Sep. 15, 1980

[51] Int. Cl.³ .............................................. G02S 13/08
[52] U.S. Cl. ............................. 343/7 ED; 343/12 R; 364/454
[58] Field of Search ......................... 343/7 ED, 12 R; 364/454

[56] References Cited

U.S. PATENT DOCUMENTS

| | | | |
|---|---|---|---|
| 3,028,592 | 4/1962 | Parr et al. | 364/454 X |
| 3,184,736 | 5/1965 | Badewitz | 343/7 ED X |
| 3,337,867 | 8/1967 | Badewitz | 343/7 ED |
| 3,670,334 | 6/1972 | Gaheen, Jr. | 343/7 ED X |
| 4,085,440 | 4/1978 | Hose | 364/454 |
| 4,168,524 | 9/1979 | Soltz et al. | 364/454 X |

Primary Examiner—T. H. Tubbesing

Attorney, Agent, or Firm—Freilich, Hornbaker, Wasserman, Rosen & Fernandez

[57] ABSTRACT

A system is provided for correcting the assumed orientation of the horizontal plane of an inertial navigation system on an aircraft, while it is flying over the ocean. The range from the aircraft to the ocean surface is measured along a boresight tilted at a small downward angle such as 6° to 12° from the horizontal, as by radar ranging, and the precise range and the precise tilt angle of the boresight with respect to the inertial or other horizontal is taken. The measured range is compared with an independently-derived range, and the difference is utilized to correct the assumed horizontal direction of the navigation system. The second range may be the range calculated on the basis of the downward tilt angle of the boresight from the assumed horizontal direction in the inertial navigation system, and the difference between the real and calculated ranges can be utilized to determine the error in the assumed horizontal direction of the inertial system.

12 Claims, 11 Drawing Figures

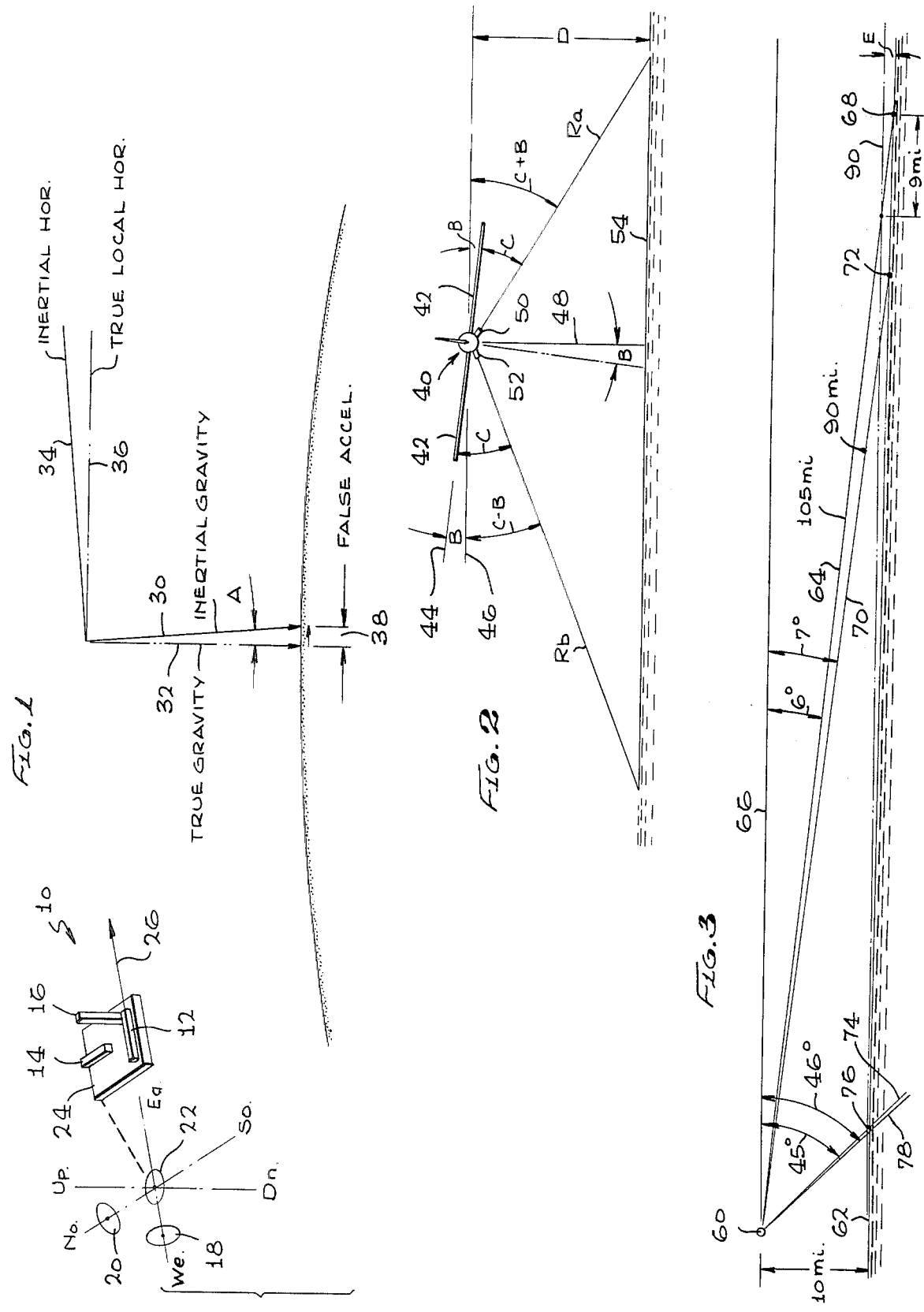

OVERWATER RADAR NAVIGATION SYSTEM

BACKGROUND OF THE INVENTION

An inertial navigation system for an aircraft, may utilize three accelerometers for measuring accelerations in three perpendicular directions, and with the first and second integrals of each accelerometer indicating the speed and position of the aircraft. Three gyroscopes may also be provided to indicate the precise direction in which each accelerometer is pointed, or in some systems may even turn the table on which the accelerometers are mounted to maintain a precise orientation. The gyroscopes are among the least accurate components of the system, and therefore the assumed and actual orientation of each accelerometer may be different. Large errors in computing the position of the aircraft can arise when an accelerometer direction which is assumed to be horizontal (with respect to the local horizontal direction) is not precisely horizontal. In that case, the effect of gravity is to introduce an erroneous acceleration into the system. For example, if an aircraft is flying at a constant forward speed so there is no forward acceleration, but the accelerometer which measures forward acceleration and which is supposed to be held horizontal is actually tilted by 0.01°, then the accelerometer will register a constant acceleration of $G \sin 0.01°$, where $G$ is the acceleration of gravity (32 feet per second$^2$). After one hour, this "ghost" acceleration would result in an error of 14 miles per hour in aircraft velocity, and a position error of 7 miles. The error would grow with time so that after three hours, the velocity error would be 42 mph and the position error would be 63 miles. It may be noted that, due to the earth's curvature, a Shuler oscillation phenomenon occurs which affects the amount of error in this situation, but the error is still of great importance.

Various techniques have been utilized to minimize position and/or velocity errors caused by deviation of the inertial horizontal or vertical from the actual local horizontal or vertical. Where the aircraft is flying over land and the locations of landmarks are known along the route, then precise corrections can be made. When landmarks are not available over land, corrections can be made by measuring the true velocity of the aircraft relative to the ground, and comparing this to the assumed velocity in the inertial navigation system. The true velocity can be determined by transmitting radar signals towards the ground and detecting the Doppler shift of the reflected radar waves. Correcting errors in the assumed velocity of the inertial system is useful, but does not provide as great an accuracy as where the precise position or orientation of the aircraft can be determined.

When the aircraft is flying over water, even velocity measurements cannot be made with great accuracy, because of ocean currents. That is, the velocity of the aircraft relative to a location on the ocean surface can be precisely determined, but that ocean surface may be moving at a speed such as a few miles an hour because it is in a current. Thus, the lack of the possibility of updating an inertial system by use of landmarks or even by accurate velocity measurements, has been an important limitation on the accuracy of inertial navigation systems when used in aircraft flying over large areas of the oceans. A system which enabled corrections to be made to the inertial reference, particularly as to its position, while it is being flown over large expanses of water, would be of great value in increasing the accuracy of inertial navigation systems.

SUMMARY OF THE INVENTION

In accordance with one embodiment of the present invention, a method and apparatus are provided for use in conjunction with an inertial navigation system on an aircraft when flying over a large expanse of water, for correcting the assumed orientation of the system with respect to the local vertical (or the horizontal plane which is perpendicular thereto). The correction can be effected by sensing the range from the aircraft to the surface of the ocean, along a boresight which is tilted downwardly from the horizontal by a small angle such as 6° to 12° or somewhat more. A signal representing this real change is compared with another signal set representing an independently-determinable range from the aircraft to the ocean along a predetermined small angle of downward tilt. The relative values of the signals are utilized to adjust the assumed horizontal direction of the inertial navigation system. The signal representing an independently-determined range, can represent the calculatable range from the aircraft to the ocean along the same boresight, based upon the assumption that the measured downward tilt angle is the angle from the true horizontal. In this case the difference between the calculatable and actually-sensed range is an indication of the error between the assumed and actual horizontal directions.

The angle of downward tilt is preferably small, so that a small error in the angle results in a large error in the detected range. The range can be determined by directing radar signals at the ocean and detecting the reflected waves, but strong reflections may not be available at small downward tilt angles. Accordingly, different look-down angles can be tried until a clear signal is obtained, and the corresponding range can then be utilized.

The novel features of the invention are set forth with particularity in the appended claims. The invention will best be understood when read in conjunction with the accompanying drawings.

BRIEF DESCRIPTION OF THE DRAWINGS

FIG. 1 is a diagram showing how an error in the assumed vertical of an inertial navigation system can lead to a large position error.

FIG. 2 is a simplified view of a system of the present invention which can be utilized to determine the true vertical.

FIG. 3 is a simplified view similar to FIG. 2, showing how the accuracy of the measurement is affected by the downward angle of the boresight along which the range is taken, as well as the curvature of the earth.

DESCRIPTION OF THE PREFERRED EMBODIMENTS

Figure 4:
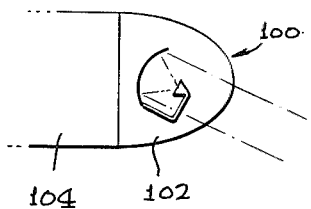
FIG. 4 is a simplified view of a radar system installed in the nose portion of an aircraft, and which can be utilized in the system of the present invention.

FIG. 1 shows a gimbaled inertial navigation system 10 for use in an aircraft, which includes three accelerometers 12, 14, 16 for measuring acceleration in three mutually perpendicular directions, and three gyroscopes 18, 20, and 22 for indicating the orientation of the aircraft. Read-outs from the gyroscopes can be utilized to tilt a table 24 on which the accelerometers are mounted, in order to maintain a locally level orientation of the accelerometers. In one example, the aircraft may be flying in the direction 26 which happens to be aligned with one of the accelerometers 12. The integral with time of the output of the accelerometer 12 will indicate the velocity of the aircraft in the direction 26, while the second integral with time of the accelerometer 12 will indicate the position of the aircraft at any given time (with respect to the initial velocity and position of the aircraft).

Present state-of-the-art accelerometers are very accurate, but the gimbals for orienting them are of a lower degree of accuracy. Accordingly, a common source of error is that the assumed local vertical direction 30 of the inertial navigation system, deviates from the true local vertical direction 32 (which is perpendicular to the ellipsoid of the earth). The accelerometer 12 will be measuring the acceleration of the aircraft along a line 34 which is at a slight upward tilt from the true local horizontal direction 36, since the accelerometer cannot distinguish between forces applied to its sensing element by reason of acceleration as opposed to the forces of gravity. The accelerometer will therefore sense that the aircraft is accelerating even though the aircraft may be flying at a constant velocity. This "ghost" or false acceleration is of a magnitude indicated at 38, which is proportional to the sine of the angle A between the assumed inertial vertical 30 and the true vertical 32 (or between the assumed inertial horizontal 34 and true horizontal 36). The error in acceleration of the aircraft is equal to G sin A, where G equals the acceleration of gravity (32 feet/second$^2$). For an error angle A of 0.01°, the false acceleration is about 0.006 feet/second$^2$. This results in a velocity error after one hour of about 15 mph and a position error of about 7 miles. The position error increases greatly with time, so that after three hours, the position error in the above example would amount to about 45 miles. If the "ghost" acceleration is lateral, it may result in the aircraft path being displaced 45 miles from the destination. Accordingly, it can be appreciated that a system which could detect small errors in the inertial vertical or gravity vector, could be useful in significantly increasing the accuracy of an inertial navigation system in an aircraft.

In aircraft flying over land, systems can be designed to correct an inertial navigation system by comparing the assumed inertial position with landmarks whose positions are known. Another technique is to determine the true velocity of the aircraft, as by measuring the Doppler shift of radar signals directed at and reflected off the ground. It should be noted that even when velocity measurements can be made, the fact that they represent the derivative of position change means they normally do not result in as important a measurement as can be obtained by determining true aircraft position or even by determining errors in aircraft orientation which give rise to the velocity and position errors. However, when an aircraft is flying over the ocean, even accurate velocity measurements cannot be made by noting the Doppler shift of radar signals reflected from the ocean. Such velocity measurements are inaccurate to the extent that the ocean surface is moving because of currents, which may be of a velocity of several miles per hour. The integral of such velocity error results in a progressively growing position error.

It would be possible for an aircraft flying over the ocean to determine the true vertical or gravity direction, which is perpendicular to the true horizontal plane, by merely looking at the optical horizon, and in fact satellites utilize this technique to orient themselves with respect to the earth. However, at moderate altitudes such as about 10 miles at which aircraft may fly, the horizon cannot be accurately detected, due to haze and weather conditions.

In accordance with the present invention, the true orientation of the aircraft can be determined with respect to the true local vertical, or the true horizontal plane which is perpendicular thereto, by measuring the range of the aircraft to the ocean surface along a boresight which is angled by only a small downward tilt from the horizontal. FIG. 2 shows the rear of an aircraft 40 with wings 42 that are aligned with the assumed horizontal plane 44 of the inertial navigation system on the aircraft, but wherein the assumed inertial horizontal 44 is actually angled from the true local horizontal 46 by an error angle B. Of course, the true local horizontal 46 is a plane tangent to the ellipsoid of the earth, and perpendicular to the vertical direction 48. The aircraft 40 contains two radar ranging devices 50, 52 that point in diametrically opposite compass directions (e.g. one pointing due North and the other due South) but each directed at precisely the same downward tilt angle C from the assumed horizontal plane 44. Each radar device 50 or 52 measures the range $R_a$ or $R_b$ from the aircraft to the surface of the ocean 54, by measuring the time required for the return of a radar signal transmitted along the corresponding line of sight, or boresight. If the error angle B is zero, the two ranges $R_a$ and $R_b$ will be equal. Otherwise, $R_a$ will be smaller than $R_b$ in an amount determined by the magnitude of the error angle B. It would be possible to repeatedly measure the ranges $R_a$ and $R_b$ and adjust the orientation of the inertial horizontal 44 to decrease the error angle B until $R_a$ and $R_b$ are substantially equal. With relatively simple calculations, the error angle B can be calculated by noting the following quality:

$$D = R_a \sin(C+B) = R_b \sin(C-B),$$

where D equals the height of the aircraft above the ocean 54 and the quantities $R_a, R_b$, C, and B are as shown in FIG. 2. Even without knowledge of the height of the aircraft D, the equation can be solved for the error angle B.

It should be noted that in order to orient the assumed inertial vertical direction with the true local vertical direction, it is necessary to determine the error between the true and assumed horizontal along two different compass directions, such as compass directions angled 90° apart. In FIG. 2, this can be accomplished by turning the radar devices 50 and 52 so that instead of pointing to either side of the aircraft, one points directly forward and the other points directly rearwardly.

In constructing a system for accurately measuring the error angle between the inertial horizontal and the true local horizontal, several factors should be taken into consideration. Since the error angle is typically very small, it is desirable to utilize a technique wherein even very small error angles between the inertial and real horizontals, result in large changes in the measured range from the aircraft to the ocean. This is accomplished by utilizing a small downward tilt angle C along which the range from the aircraft to the ocean is taken.

FIG. 3 shows a situation wherein an aircraft at the point 60 is located 10 miles (approximately 53,000 feet) above the ocean surface 62 and makes a range measurement along a boresight 64 that is angled by 6° from the true horizontal 66. The range along the boresight 64 from the aircraft 60 to the ocean surface at the point 68, will be measured to be approximately 105 miles. If the downward tilt angle were 7°, the boresight would be as shown at 70, and the range along this boresight 70 from the aircraft 60 to the ocean surface at 72 would be approximately 90 miles. Thus, for a small downward tilt angle of about 6°, a change in the angle of about 1° in the above example results in a change in range of about 15 miles, or about a 14% change in the measured range. In an actual navigation system, the error angle may be on the order of 0.01°, so that in the above example, the change in range would be about 0.15 miles or about 800 feet. Typical ranging radar systems can measure distances to within about 10 feet. Accordingly, at a small downward tilt angle such as about 6°, even a very small error angle will result in a large change in the measured range from the aircraft to the ocean, and the amount of the error angle can be accurately determined.

FIG. 3 also shows the effect of ranging at a large angle such as 45°, so that the range would be taken along a boresight 74 to measure the range between the aircraft 60 and a point 76 on the ocean surface. The measured range would be 14.142 miles. If the angle is increased to 46°, along another boresight 78, the range from the aircraft 60 to the ocean surface would be 13.902 miles. This difference in range is only 0.240 miles (and also represents only a 1.7% change in range). If the error angle is only 0.01° from an assumed 45° boresight angle, then the difference in range would be only about fifteen feet which is of the same order of magnitude as the accuracy of a typical ranging radar. Accordingly, at a large downward tilt angle such as 45°, a small error in the downward tilt angle cannot be determined with considerable accuracy.

In utilizing the system of the present invention, several factors have to be taken into consideration. One factor is the limited range of radar systems, which may have a range such as 100 miles. An aircraft flying at a high altitude such as 60,000 feet or more, which directs a ranging radar signal along a small downward tilt angle from the horizontal, will have to detect reflections from a distance of much more than 100 miles. Therefore, at such high altitudes, the aircraft will have to utilize a somewhat larger downward tilt angle. At lower altitudes, a small downward tilt angle will not result in an excessive ranging distance. Another factor to be considered is that where the boresight of the radar signal is at a low angle to the horizontal, there is a good possibility that insufficient radiation will be reflected from the ocean back to the aircraft to enable a range measurement to be made. In this case, the downward tilt angle may be increased, such as from 6° to 12°, and then perhaps to 18°, until a sufficiently strong echo is detected to enable a precise range measurement to be made. Since the sensitivity increases as the tilt angle decreases, it is generally desirable to utilize a minimum tilt angle at which strong enough reflections are detected to enable accurate range measurements to be made.

Figure 7:
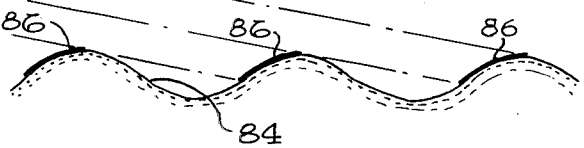
FIG. 7 is a diagram showing how radar reflections from ocean waves can be obtained in accordance with the present invention.

Another factor to be considered is that there are waves at the ocean surface. FIG. 7 illustrates the manner in which a radar signal 82 is reflected off the ocean surface 84. Since there are waves present and the radar signal at a low incidence angle cannot reach the troughs of the waves, the reflections are made only off of the crest portions 86 of the waves. The crest portions may be several feet higher than the average height of the ocean, but this normally will not be significant. In fact, where range measurements are made to either side of the aircraft, as in FIG. 2, the height at which the reflections are taken will be the same for radar signals transmitted in the opposite directions from the aircraft, and the exact height from which the reflections are made will have no appreciable effect. Another factor to be considered is that the earth is curved, so that a long range measurement such as 100 miles is affected to a large extent by the curvature of the earth. In FIG. 3, wherein the range along the boresight 64 is about 105 miles, the height of the ocean at the point 68 is lower than the height of an imaginary flat surface 90 which is tangent to the earth at a location directly below the aircraft 60. This difference in height E is about 1.2 miles, and results in the length along the boresight 64 being about 9 miles greater than if the range were taken to the imaginary flat surface 90.

If the method for correcting errors in the inertial navigation system involves ranging in two opposite directions from the aircraft, then the curvature of the earth is not of great importance, since the earth is curved at both of the opposite directions from the aircraft. However, in another system to be described below, wherein signals representing a single actual range measurements are compared with signals representing a range that can be calculated by using the assumed orientation of the inertial system, the curvature of the earth must be taken into account.

While it is possible to provide a pair of radar devices for ranging in opposite directions from an aircraft, it is usually more feasible to utilize existing radar that may be located in the nose cone of the aircraft and which can be directed along a wide range of primarily forward directions. FIG. 4 illstrates such a radar system 100 mounted in a nose cone 102 of an aircraft fuselage 104. Such a radar system may be already provided on the aircraft for other purposes such as weapons delivery, and by utilizing the radar some of the time for ranging to the ocean, the cost of the navigation system can be significantly reduced. It should be noted that other ranging devices can be utilized such as those which emit laser beams. The most accurate ranging systems are those which emit electromagnetic waves such as of radar (microwave) or laser (optical) frequencies.

Figure 5:
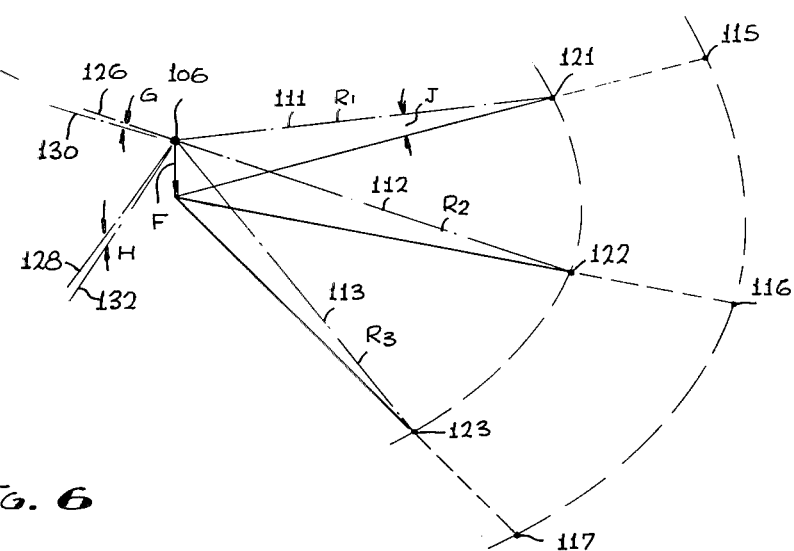
FIG. 5 is a diagram showing how measurements in a method of the present invention can be performed utilizing the radar system of FIG. 4.

FIG. 5 shows how the radar system which points primarily forwardly (but it can point straight down to measure the aircraft height) can be utilized on an aircraft at 106 to determine whether there is an error between the true local vertical and the assumed inertial navigation system vertical. The aircraft is flying at a distance F above the ocean, and directs radar signals along three boresights 111, 112, and 113 to determine the range along these boresights to the ocean. The boresight 112 is in a compass direction aligned with the longitudinal axis of the aircraft, while the two other boresights 111 and 113 are in compass directions angled 45° from the compass direction of the boresight 112. All of the boresights 111-113 are at the same downward angle J from the assumed horizontal plane of the inertial navigation system. Initially, the radar may be directed at an angle smaller than the angle J, to attempt to determine the range to points 115-117, and the downward tilt angle is gradually increased until a clear echo is detected from the ocean when the boresights detect the range to the ocean locations 121-123.

Figure 8:
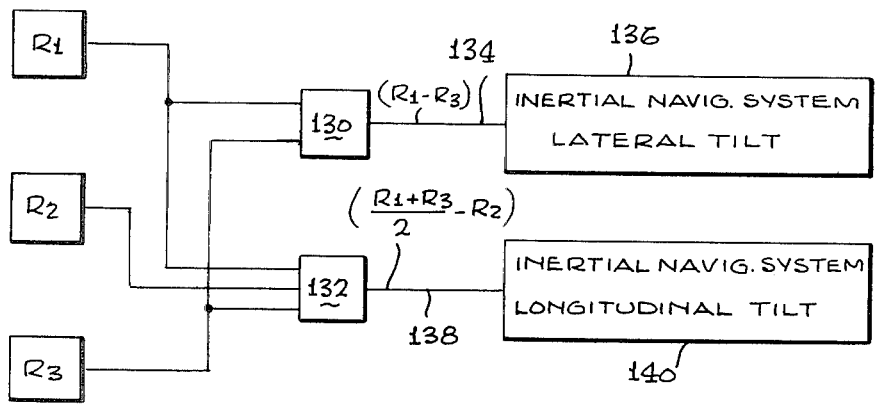
FIG. 8 is a simplified diagram of a system which can be utilized to determine the true orientation of an aircraft utilizing the measurements indicated in FIG. 5, and which can be utilized to correct the assumed orientation of an inertial navigation system.

The three ranges $R_1$, $R_2$, and $R_3$ measured in accordance with FIG. 5, can be utilized to correct the angular errors G and H between the true horizontal directions 126 and 128, and the inertial horizontal directions 130 and 132. The lines 130 and 132 extend in perpendicular compass directions; e.g. the line 126 may extend in the East-West direction, while the line 128 may extend in the North-South direction. In the circuit of FIG. 8, the ranges $R_1$, $R_2$, $R_3$, are delivered to two computing circuits 130, 132, whose outputs are as indicated. If the error angle H (FIG. 5) between the true lateral horizontal direction 128 and the assumed inertial lateral horizontal direction is zero, then $R_1$ will equal $R_3$, and the output from the circuit 130 will be zero. The magnitude of the output from the circuit 139 is an indication of the magnitude of the error angle H. Accordingly, the measurements $R_1$ and $R_3$ may be repeatedly taken, and the assumed lateral horizontal direction of the inertial system may be repeatedly corrected, until the difference between $R_1$ and $R_3$ is insignificant. Thus, the output of the circuit 130 may be repeatedly delivered to an input 134 of a circuit 136 that represents the lateral tilt orientation of the inertial navigation system to repeatedly tilt the inertial system with respect to the aircraft. If the error angle H indicated in FIG. 5 is positive, then $R_1$ will be greater than $R_3$ and if $R_1$-$R_3$ is a negative nunber then the correction is made in the opposite direction.

The output of the circuit 132 in FIG. 8 is $(R_1+R_3)/2-(R_2)$. If the error angle indicated at G in FIG. 5 is positive as shown, then $(R_1+R_3)/2$ will be greater than $R_2$, and the longitudinal tilt orientation of the inertial navigation system must be altered with respect to the aircraft to decrease the angle G. The output of the circuit 132 is delivered to an input 138 of an inertial navigation system longitudinal tilt circuit 140, to change the orientation of the assumed inertial longitudinal horizontal with respect to the aircraft. In the above example wherein the ranges $R_1$ to $R_3$ are compared, it is assumed that the three range measurements are taken at the same time, or the aircraft orientation (and height) does not change significantly between the times when the different measurements are taken.

Figure 6:
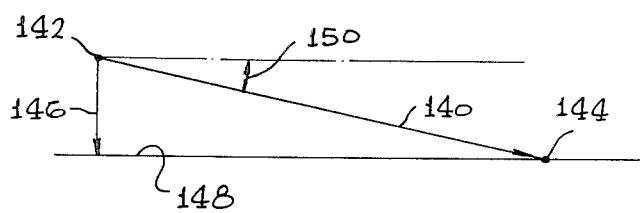
FIG. 6 shows how each measurement conducted in the manner indicated in FIG. 5 can be utilized to correct the assumed orientation of an inertial navigation system.

The orientation of the inertial vertical with respect to the real vertical can be most easily determined by comparing a single range measurement at a time, to a calculated range or to signals representing the calculatable range. The calculated range is the range computed on the basis of the aircraft orientation indicated by the inertial navigation system. The calculation of the expected range along a particular boresight, can be accomplished by first determining the height of the aircraft above the ocean. The aircraft height can be determined accurately by radar-ranging in a vertical direction from the aircraft to the ocean. The vertical range is not affected to any significant degree by small errors in the inertial vertical. FIG. 6 indicates the manner in which the range 140 between the aircraft 142 and the ocean surface at 144 can be calculated. The calculated range is based upon the height 146 of the aircraft above the ocean surface 148, and the downward tilt angle 150 from the horizontal of the boresight along which the range is calculated.

If the earth were flat, the range 140 shown in FIG. 6 would be equal to the height 146 divided by the sine of the downward tilt angle 150. Since the earth's surface is curved as an ellipsoid, and this curvature has an important effect upon the calculated range, it must be taken into account. However, such calculations can be easily made by state of the art computers. The system can be utilized by making an actual radar range measurement along a downward tilt angle 150 from the inertial horizontal direction, and comparing the actual range measurement with the calculated range measurement. The difference between the actual and calculated ranges indicates the error angle between the inertial horizontal direction and the true local horizontal direction (along the same compass direction as the boresight 140). For the example discussed above in connection with FIG. 3, a calculated range along the boresight 64 of 105 miles and an actual range of 90 miles, would indicate that the inertial navigation system was in error by 1°, for an aircraft at a 10 mile altitude and an assumed downward tilt of 6°. In an actual system wherein the error may be 0.01°, the difference between the calculated distance of 105 miles along the boresight 64 and an actual range measurement which is 0.15 miles less than the calculated range, would indicate that the inertial system was in error by 0.01° (so that the actual boresight was at an angle 6.01° from the true horizontal, instead of 6.00°).

Figure 9:
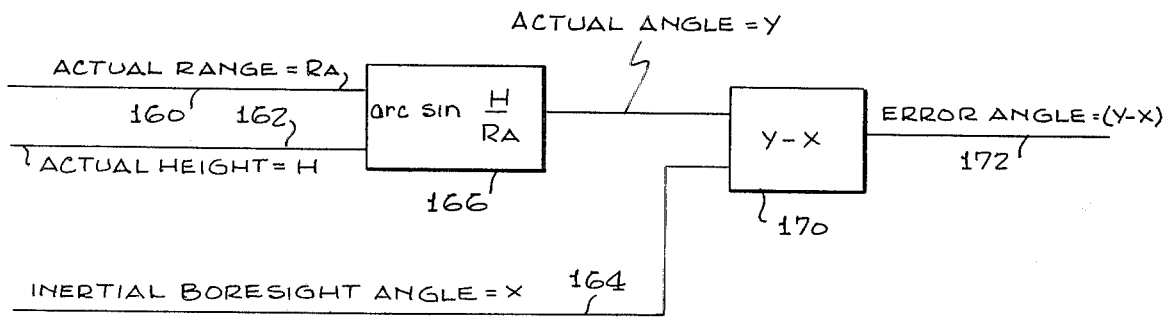
FIG. 9 is a simplified block diagram view of an inertial navigation system constructed in accordance with another embodiment of the invention.
Figure 10:
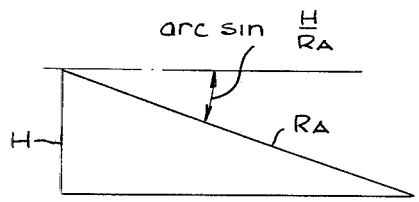
FIG. 10 is a diagram explaining the basis of calculations of the system of FIG. 9.

FIG. 9 is a simplified block diagram of an inertial navigation system which can utilize a single actual range measurement to determine the error angle between the true and inertial horizontal, along the compass direction in which the range measurement is taken. The circuit has three input lines, including a first line 160 which receives a singal $R_A$ representing the actual range along a predetermined boresight. A second line 162 receives a signal H representing the actual height of the aircraft above the ocean. A third line 164 receives a signal X representing the downward tilt angle of the boresight along which the range was taken, as measured from the inertial horizontal. The two signals on lines 160 and 162 are delivered to a circuit 166 which computes the actual downward tilt angle of the boresight along which the actual range was measured. In this simplified explanation, no account is taken of the curvature of the earth. Accordingly, the actual downward tilt of the boresight angle is merely equal to the arc sin $H/R_A$. This is shown in FIG. 10. The signal representing the actual angle is delivered over line 168 to a circuit 170 which also receives the signal 162 representing the downward tilt of the boresight from the inertial horizontal. The difference between the angles is calculated by the circuit 170 whose output on line 172 represents the difference or error angle between the true horizontal and the assumed inertial navigation system horizontal. This difference signal on line 172 can be utilized to adjust the assumed inertial horizontal direction with respect to the aircraft, along the compass direction at which the actual range was measured.

As discussed above, the curvature of the earth is an important factor in determining the range of the aircraft to the ocean surface along a small downward tilt angle from a high flying aircraft. A simple technique for taking this into account, shown in the circuit of FIG. 9, is to adjust the height signal H, so that it represents the height of the aircraft above the earth plus the vertical difference between the height of the earth's surface directly under the aircraft and the height of the earth's surface at the location where the boresight intersects the earth. In FIG. 3, this difference shown at E is about 1.2 miles at a location about 105 miles away from the aircraft at 60, which is the approximate range taken along a 6° downward tilt from an aircraft flying at a height of 10 miles. Thus, in FIG. 3, an adjustment for the earth's curvature can be taken by assuming that the earth is flat, but that the height of the aircraft is equal to its actual height above the ocean along the local vertical, plus the quantity E.

Figure 11:
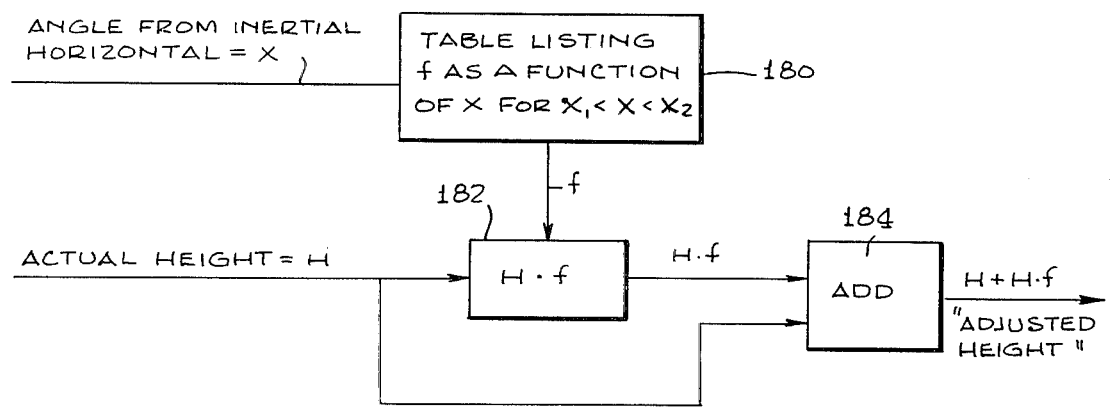
FIG. 11 is a simplified block diagram of a circuit which can be used in conjunction with the system of FIG. 9.

FIG. 11 shows how this "adjusted" height can be determined, by multiplying a factor f derived from a look-up table 180 which provides a different factor f for different look-down angles. This factor f is multiplied by the height H of the aircraft in a circuit 182. The actual height H and the correction factor H·f are added together in another circuit 184, and the output from this circuit 184 can be substituted for the actual height signal delivered over line 162 in FIG. 9. A different look-up table may be required for different ranges of heights of the aircraft above the ocean; for example, the table 180 may be useful only for heights between 9.5 miles and 10.5 miles. In actual practice, the correction for the earth's curvature can be made by a computer programmed to account for the ellipsoidal curvature of the earth.

While gimbaled inertial navigation systems have been widely used in the past, strap down inertial systems, which have been introduced in the last several years, are typically less expensive. In the strap-down version, the accelerometers are fixed in orientation with respect to the aircraft, and acceleration, velocity, and position in various directions is determined by utilizing greater computing power. A typical platform may have an error growth of 0.8 miliradian per hour. The system of the present invention enables the local vertical to be determined within about 0.1 to 0.2 miliradians. This enables the error growth rate to be lowered by a factor of about 6 or 7, to reduce the error growth from perhaps 0.8 miliradian per hour to about 0.1 miliradian per hour. The ranging equipment such as a synthetic array radar, may be already provided in the aircraft, and the ranging function for correcting the inertial navigation system can be performed on a time shared basis with other functions of the radar. The primary increase in complexity of the inertial system of the present invention which enables correction of the inertial vertical, involves the programming of the onboard computer, which may be of relatively low cost when the correction system is utilized on many aircraft.

In utilizing the system of the present invention, an aircraft flying over large expanses of ocean may repeatedly take range measurements to update the local vertical of the inertial navigation system. When the aircraft is flying over land, where the altitude of the earth varies greatly, the inertial correction system will be switched to another mode of correction such as one based upon comparing true and assumed velocity of the aircraft.

Thus, the invention provides a system for correcting the assumed orientation of an inertial navigation system with respect to the local vertical, or with respect to the horizontal which is perpendicular to the vertical, for an aircraft flying over large expanses of water. This is accomplished by determining the actual range from the aircraft to the ocean surface along a small downward tilt from the horizontal, and comparing the signal representing the actual range to another signal. In one embodiment of the invention, the other signal can represent the actual range from the aircraft to the ocean taken along another compass direction. In another embodiment of the invention, the other signal to which the actual range is compared may represent a computed range to the ocean. The computed range is along a boresight tilted from the actual horizontal by an angle equal to that of the actual boresight from the inertial horizontal. In such a comparison of the actual and computed values, the comparison can be made between the actual range and data on which a computed range would be based, this data including the actual height of the aircraft above the ocean and the measured angle between the boresight and the inertial horizontal.

Although particular embodiments of the invention have been described and illustrated herein, it is recognized that modifications and variations may readily occur to those skilled in the art and consequently, it is intended that the claims be interpreted to cover such modifications and equivalents.

I claim:

1. A method for correcting the assumed orientation of an inertial navigation system on an aircraft flying over water, to more closely correspond with the actual local horizontal or vertical, comprising:

directing an electromagnetic beam from the aircraft along a boresight which is at a precisely known downward angle from the inertial horizontal and along a compass direction that is precisely known with respect to the inertial system, detecting the reflection to determine the range to the earth's surface along that boresight, and generating a real distance signal representing the actual range;

generating data representing the expected range along said boresight to the earth's surface based upon the assumed orientation of the inertial navigation system; and comparing said real signal and said data, and correcting the assumed orientation of the inertial navigation system in accordance with the relative values of said real signal representing the actual range and said data representing the expected range.

2. The method described in claim 1 wherein:

said step of directing a beam includes directing the beam along a boresight which is at a downward angle of less than 18° from the inertial horizontal, whereby a small angular variation produces a large change in the range to enable precise angular determinations to be made.

3. The method described in claim 1 including:

initially directing said radar signal at a small downward tilt angle of less than 12°, and then at least one larger angle until a clear reflected signal is detected, and determining the range at substantially the minimum angle at which a clear reflection is obtained.

4. The method described in claim 1 wherein:
said step of generating data includes generating a height signal representing the height of the aircraft above the ocean, and generating an inertial angle signal representing the angle between said boresight and the inertial horizontal; and
said step of comparing includes generating an angular error signal equal to $$(\text{arc sin } H/R_A) - X$$

where H is the height represented by said height signal as adjusted for curvature of the earth, $R_A$ is the range represented by the real distance signal, and X is the angle represented by said inertial angle signal.

5. A method for correcting the assumed orientation of an inertial navigation system on an aircraft flying over an ocean, comprising:
sensing the range from the aircraft to the surface of the ocean along a boresight tilted downward from the horizontal by a small angle which is much less than 45°, and comparing a signal representing the sensed range sensed along the boresight with data representing another independently-determined range that would equal the sensed range if the horizontal of the inertial system were precisely horizontal; and
adjusting the assumed orientation of the inertial navigation system in accordance with the disparity between the ranges represented by said signal and said data.

6. The method described in claim 5 wherein:
said step of comparing a signal representing sensed range with data representing another range, includes comparing said signal representing sensed range with data representing the range that can be calculated in accordance with the inertial navigation system, by assuming the downward tilt of the boresight is at a predetermined angle equal to the measured angle of the boresight from the inertial horizontal and by assuming that the aircraft is at a predetermined height above the ocean.

7. The method described in claim 5 including:
sensing the range from the aircraft to the surface of the ocean along a second boresight which is tilted downwardly from the horizontal by a small angle which is much less than 45°, and which extends in a compass direction angled by more than 45° from the compass direction of said first mentioned boresight, and generating said data to be a function of the range sensed along said second boresight.

8. The method described in claim 7 wherein:
said second boresight extends in a compass direction angled 180° from the compass direction of said first mentioned boresight, and at the same downward tilt angle with respect to the inertial horizontal as said first mentioned boresight; and
said step of adjusting includes changing the assumed horizontal direction of the inertial navigation system to upwardly tilt the inertial horizontal in the boresight direction along which the smaller of the ranges was sensed.

9. The method described in claim 5 wherein:
said step of sensing includes directing electromagnetic signals along boresights extending in at least two different compass directions, and detecting the reflections to determine the ranges in said directions, and said step of comparing includes comparing signals representing said ranges, whereby to minimize the effect of at least wave height on the accuracy of sensed orientation.

10. Apparatus for correcting the assumed orientation of an inertial navigation system on an aircraft flying over the ocean, comprising:
means for determining the actual range at a given instant, from the aircraft to the surface of the ocean along a first boresight tilted downwardly from the horizontal by a small angle which is much less than 45°, and for generating a first signal representing said range;
means for generating second signals representing the range from the aircraft to the surface of the ocean along a direction downwardly tilted from the horizontal, as determined independently from the actual range measured along said first boresight; and
means responsive to the relative magnitudes of said signals for adjusting the assumed horizontal direction of said inertial navigation system.

11. The apparatus described in claim 10 wherein:
said means for generating second signals is constructed to generate a height signal representing the height of the aircraft above the ocean, and to generate an inertial angle signal representing the angle between said boresight and the inertial horizonta; and
said means for adjusting includes a computing circuit constructed to generate an angular error signal equal to $$(\text{arc sin } H/R_A) - X$$

where H is the height represented by said height signal as adjusted for curvature of the earth, $R_A$ is the range represented by said first signal, and X is the angle represented by said inertial angle signal.

12. Apparatus for correcting the assumed orientation of an inertial navigation system on an aircraft flying over the ocean, comprising:
means for directing an electromagnetic beam from the craft along a boresight which is tilted downwardly at a precisely known angle from the inertial horizon and along a controlled compass direction, measuring the delay in detecting a reflection of said beam, and generating a first signal representing the actual range to the ocean surface along said boresight in accordance with said delay;
means for generating a second signal representing the expected range along said boresight, based at least in part upon the angle between said boresight and the assumed horizontal direction of the inertial navigation system; and
means responsive to the correspondence of said first and second signals, for correcting the assumed orientation of the inertial navigation system.

* * * * *